(12) United States Patent
Fischer et al.

(10) Patent No.: US 7,093,854 B2
(45) Date of Patent: Aug. 22, 2006

(54) AIR BAG WITH ACTIVE TEAR STITCH TETHERS

(75) Inventors: Kurt F. Fischer, Oxford, MI (US); Ken Taggart, St. Clair Shores, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 140 days.

(21) Appl. No.: 10/662,243

(22) Filed: Sep. 15, 2003

(65) Prior Publication Data

US 2005/0057030 A1    Mar. 17, 2005

(51) Int. Cl.
*B60R 21/16*    (2006.01)

(52) U.S. Cl. .................................. 280/743.2

(58) Field of Classification Search ............ 280/743.2, 280/743.1, 742
See application file for complete search history.

(56) References Cited

U.S. PATENT DOCUMENTS

| | | | |
|---|---|---|---|
| 3,879,056 | A | 4/1975 | Kawashima et al. |
| 5,308,113 | A | 5/1994 | Moriset |
| 5,489,119 | A | 2/1996 | Prescaro et al. |
| 5,613,708 | A | 3/1997 | Bleider et al. |
| 5,678,858 | A | 10/1997 | Nakayama et al. |
| 5,813,696 | A | 9/1998 | Hill |
| 5,997,037 | A | 12/1999 | Hill et al. |
| 6,076,854 | A * | 6/2000 | Schenck et al. ......... 280/743.2 |
| 6,502,858 | B1 * | 1/2003 | Amamori ................. 280/743.2 |
| 6,648,371 | B1 * | 11/2003 | Vendely et al. ............. 280/739 |
| 6,701,849 | B1 | 3/2004 | McFarland et al. |
| 2001/0035639 | A1 | 11/2001 | Amamori |
| 2002/0175511 | A1 | 11/2002 | Dunkle et al. |
| 2004/0046376 | A1 * | 3/2004 | Ryan ...................... 280/743.2 |

FOREIGN PATENT DOCUMENTS

| | | |
|---|---|---|
| DE | 29609703 | 11/1996 |
| DE | 29707162 | 7/1997 |
| DE | 19628836 | 1/1998 |
| DE | 19756977 | 7/1999 |
| DE | 19813832 | 9/1999 |
| DE | 19930239 | 1/2001 |
| DE | 10107273 | 8/2002 |
| EP | 1398226 | 3/2004 |
| JP | 2000071911 | 3/2000 |

* cited by examiner

*Primary Examiner*—Faye M. Fleming
(74) *Attorney, Agent, or Firm*—Tarolli, Sundheim, Covell & Tummino LLP

(57) ABSTRACT

An air bag (12) includes at least one tether (44) and an inflation fluid source (14) having two modes of operation. In the first mode of operation, the inflation fluid source (14) is activated to provide a first inflation fluid pressure in the air bag (12). In the second mode of operation, the inflation fluid source (14) is activated to provide a second inflation fluid pressure in the air bag (12) higher than the first pressure. The tether (44), which helps to control the shape of the air bag (12), tears in response to the second inflation fluid pressure in the air bag.

20 Claims, 5 Drawing Sheets

Fig.3

AIR BAG WITH ACTIVE TEAR STITCH TETHERS

TECHNICAL FIELD

The present invention is directed to a vehicle occupant safety apparatus. In particular, the present invention is directed to an inflatable vehicle occupant protection device with releasable tethers, which help to control the shape of the inflatable vehicle occupant protection device upon inflation.

BACKGROUND OF THE INVENTION

It is known to control the shape of an inflatable vehicle occupant protection device to help protect occupants of a vehicle during a vehicle crash. One way to control the shape of an inflating air bag is with releasable tethers. The releasable tethers may have tear stitches that tear under certain conditions to release the tethers.

SUMMARY OF THE INVENTION

A vehicle occupant safety apparatus includes an inflatable vehicle occupant protection device for, when inflated, helping to protect an occupant of a vehicle. The apparatus includes at least one tether that helps to control the shape of the inflatable vehicle occupant protection device when the inflatable vehicle occupant protection device is inflating.

The apparatus includes an inflation fluid source with two modes of operation. In the first mode of operation, the inflation fluid source is activated to provide a first inflation fluid pressure in the inflatable vehicle occupant protection device. In the second mode of operation, the inflation fluid source is activated to provide a second inflation fluid pressure in the inflatable vehicle occupant protection device higher than the first pressure. The tether remains intact due to the first inflation fluid pressure in the inflatable vehicle occupant protection device. The tether releases due to the second inflation fluid pressure in the inflatable vehicle occupant protection device.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
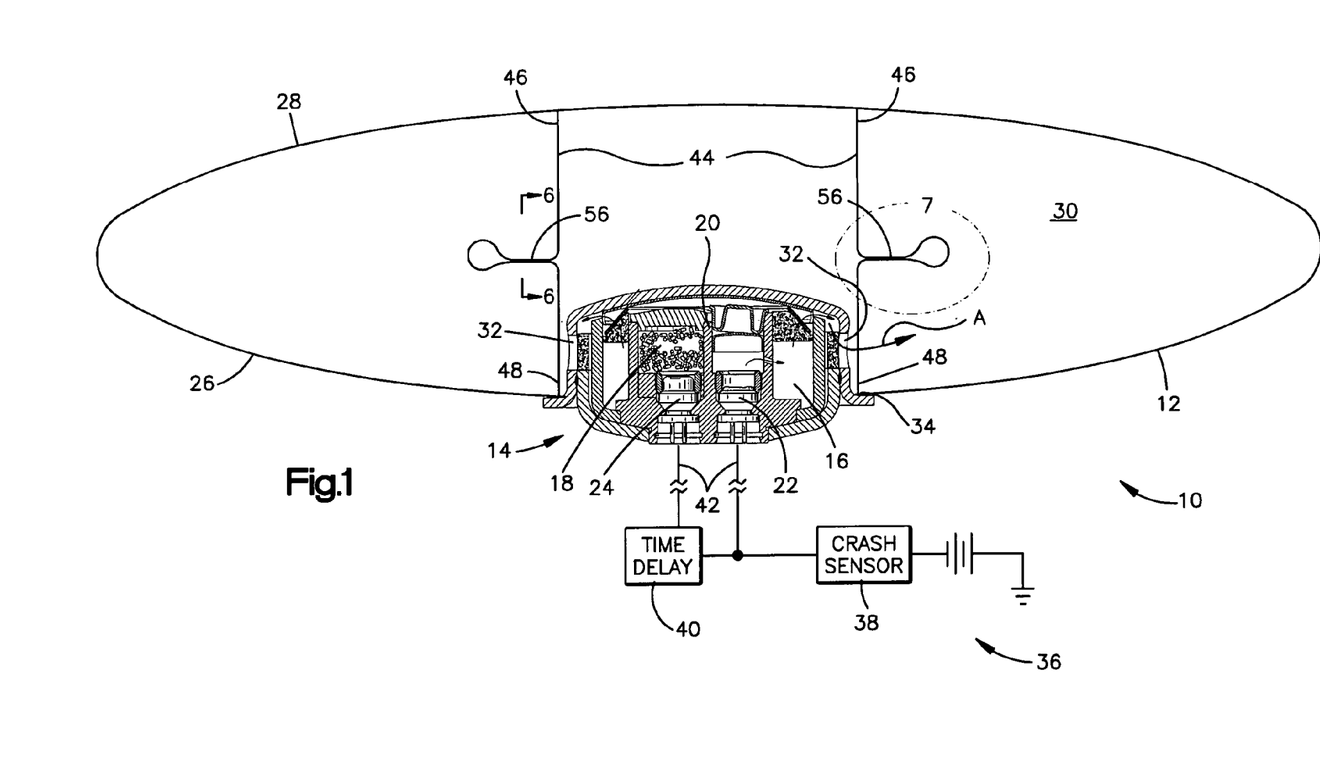
FIG. 1 is a schematic view of an embodiment of the invention.

The present invention is directed to a vehicle occupant safety apparatus for helping to protect an occupant of a vehicle. In particular, the present invention is directed to an inflatable vehicle occupant protection device with releasable tethers, which help to control the shape of the inflatable vehicle occupant protection device upon inflation. As representative of the present invention, FIG. 1 schematically illustrates an inflatable vehicle occupant protection device in the form of an air bag 12.

The air bag 12 forms part of a vehicle occupant safety apparatus 10. The apparatus 10 includes an inflation fluid source such as inflator 14 for inflating the air bag 12. The inflator is a schematically illustrated dual stage type inflator 14 as disclosed in U.S. Patent Application Publication No. US-2002-0144621-A1 published on Oct. 10, 2002, the contents of which is hereby incorporated by reference.

The dual stage inflator 14 has first and second combustion chambers 16, 18. The first and second combustion chambers 16, 18 are separated from each other by a wall 20. Each of the first and second combustion chambers 16, 18 contain a pyrotechnic material ignitable to generate inflation fluid in the form of gas for inflating the air bag.

The dual stage inflator 14 includes first and second separately actuatable igniters 22, 24. The material in the first combustion chamber 16 is ignited by the first igniter 22. The material in the second combustion chamber 18 is ignited by the second igniter 24.

The first and second combustion chambers 16, 18 could alternatively contain a stored quantity of pressurized inflation fluid and an ignitable material for heating the inflation fluid or a stored quantity of pressurized inflation fluid for inflating the air bag 12.

Although not illustrated, the air bag 12 has a stored condition in which the air bag 12 is folded inside a module. The module is connected to a steering wheel of the vehicle on the driver side of the vehicle (not shown).

The air bag 12 is made of fabric material and includes a back wall 26 defining an opening 34 into which the inflator 14 partially extends and a front wall 28 opposite the back wall 26. The front and back walls 28, 26 define an interior chamber 30 into which the inflation fluid flows.

The dual stage inflator 14 includes a plurality of inflation fluid outlets 32 in fluid communication with the air bag 12. The inflation fluid outlets 32 are side outlets that are evenly distributed around the circumference of the inflator 14. The flow of the inflation fluid out of the inflator 14 through the outlets 32 is in a plurality of directions around the circumference of the inflator 14.

The apparatus 10 includes vehicle electric circuitry 36 including a controller (not shown) and a sensor, illustrated schematically at 38 for sensing an event for which inflation of the air bag 12 is desired, such as a collision. Other sensors (not illustrated) may include an occupant position sensor that generates a control signal indicative of the position of a vehicle occupant in the interior of a vehicle, a buckle switch for generating a control signal indicative of a buckled or unbuckled condition of a seat buckle assembly of the vehicle, or one or more of the following: a sensor that senses the presence of a rearward-facing child seat, a weight sensor, a belt tension sensor, an occupant size sensor, a module temperature sensor, or a crash severity sensor.

If the vehicle condition sensed by one or more of the sensors is at or above a first predetermined threshold level, it indicates the occurrence of a condition having a first predetermined threshold level of severity. The first threshold level of severity is a level at which inflation of the air bag 12 at a relatively low rate is desired for protection of a vehicle occupant. If the vehicle condition sensed by one or more of the sensors is at or above a second predetermined threshold level, it indicates the occurrence of a condition having a second, higher, predetermined threshold level of severity. The second threshold level of severity is a level at which inflation of the air bag at a relatively high rate is desired for protection of a vehicle occupant.

The condition sensed by the crash sensor 38 preferably is a sudden vehicle deceleration that is caused by a collision. The magnitude and duration of the deceleration are measured by the crash sensor 38. If the magnitude and duration of the deceleration meet or exceed predetermined threshold levels, they indicate the occurrence of a crash that meets or exceeds the predetermined threshold levels of crash severity. The condition sensed by the remaining sensors may include a position of the occupant in the interior of a vehicle that is in the contact path of the air bag, a buckled or unbuckled condition of a seat buckle assembly of the vehicle, the presence of a rearward-facing child seat, a heavy or light-weight occupant, the seat belt tension, a large or small-size occupant, and the temperature of the module.

The vehicle electronic circuitry 36 also may include time delay circuitry 40 for delaying the time when the second igniter 24 is actuated after the first igniter 22 has been actuated. Depending on which of the combination of signals from the sensors is sent to the controller, the controller determines: 1) that no actuation signal is to be sent to the inflator, or 2) that an actuation signal is sent to the inflator to actuate both igniters at the same time, or 3) to delay the time of activation of the second igniter 24 after the first igniter 22 has been actuated, or 4) to actuate only igniter 22 without ever igniting igniter 24.

For example, in the case of signals received that indicate a forward positioned medium weight occupant and a medium impact collision occurring at medium speed, it may be desirable to delay the time of activation of the second igniter 24 after the first igniter 22 has been actuated. In a second example, in the case of signals received that indicate a rearward facing child seat and a vehicle collision, it may be desirable to not actuate the inflator. In a third example, in the case of signals received that indicate a large size occupant and a severe vehicle collision, it may be desirable to actuate both igniters at the same time. In a fourth example, in the case of signals received that indicated a light weight occupant and a low impact collision at slow speed, it may be desirable to actuate only igniter 22.

The dual stage inflator 14 is operatively connected to the sensor 38 via lead wires 42. Upon sensing the occurrence of an event for which inflation of the air bag 12 is desired, such as a vehicle collision, the sensor 38 provides a signal to the dual stage inflator 14 via the lead wires 42. In a first mode of operation of the dual stage inflator 14, upon receiving the signal from the sensor 38, the first igniter 22 of the dual stage inflator 14 is actuated and provides a first inflation fluid pressure in the air bag 12.

Arrows A in FIG. 1 schematically illustrate the inflation fluid flowing through the inflation fluid outlets 32 from the first combustion chamber 16 in the dual stage inflator 14 into the air bag 12. The air bag 12 is in a partially inflated condition in FIG. 1 with a first fluid inflation pressure. The air bag 12, while inflated, helps protect the vehicle occupant from impacts with the steering wheel. This is a first mode of operation of the dual stage inflator 14.

Figure 2:
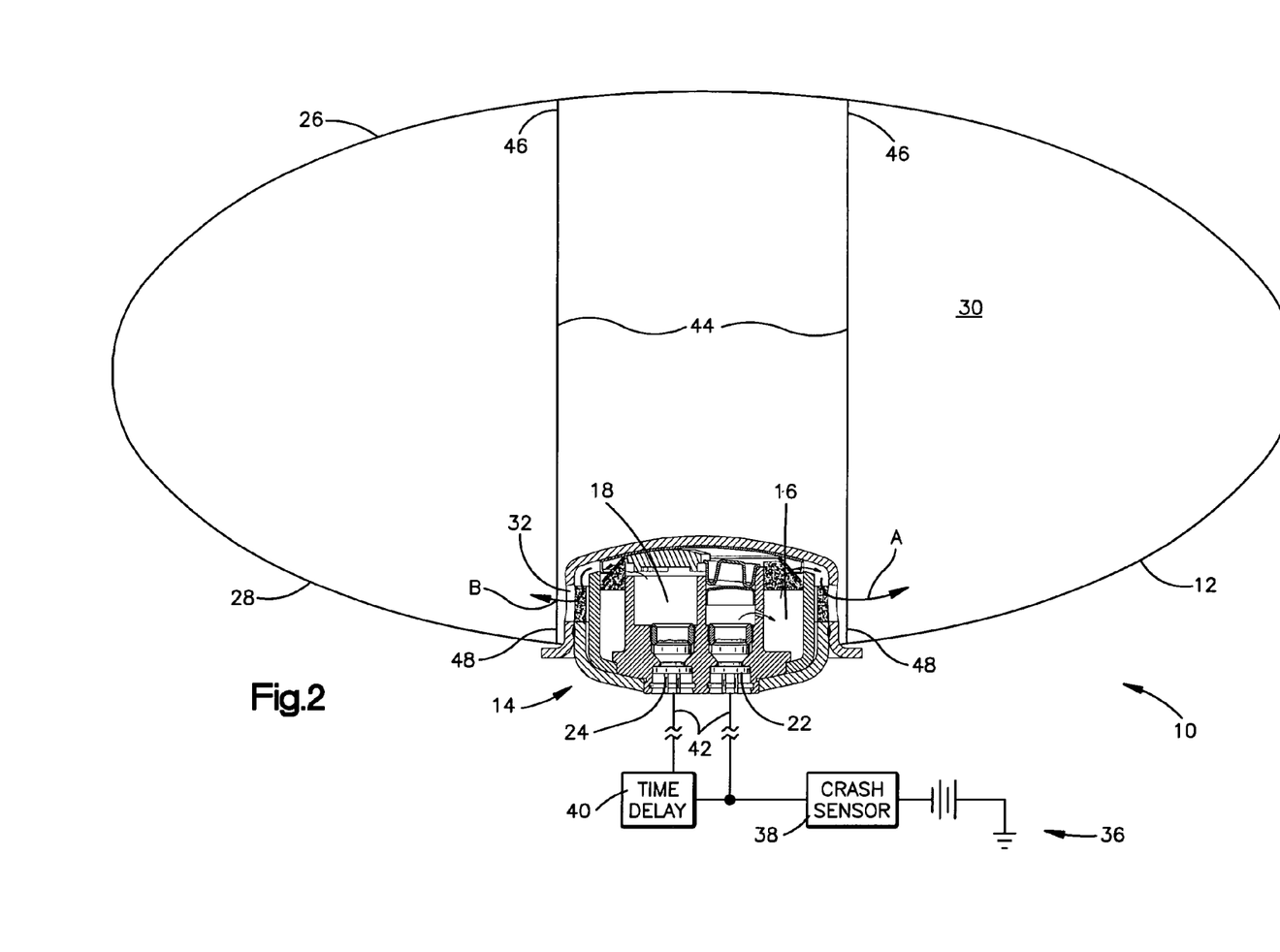
FIG. 2 is a schematic view of the embodiment according to FIG. 1 illustrating some parts in another condition.

If both igniters 22, 24 are actuated at the same time or if the second igniter 24 is actuated (FIG. 2) after a predetermined time has passed according to the time delay circuit 40, the dual stage inflator 14 operates in a second mode of operation. In the second mode of operation, the material in the second combustion chamber 18 is ignited and flows though the inflation fluid outlets 32 into the interior chamber 30 of the air bag 12. Arrows B in FIG. 2 schematically represent the inflation fluid flowing through the outlets 32 from the second chamber 18. The second inflation fluid pressure is provided in the air bag 12 by the inflation fluid flowing from both the first and second combustion chambers (arrows A and B).

The second inflation fluid pressure in the air bag 12 is higher than the first inflation fluid pressure. Thus, the first inflation fluid pressure in the air bag 12 is lower than the second inflation fluid pressure.

The apparatus 10 includes at least one tether 44 for controlling the shape of the inflating air bag 12. The embodiment according to FIGS. 1 and 2 illustrates two tethers 44. Each tether 44 is located in the interior chamber 30 of the air bag 12.

The tethers 44 are each made from a piece of elongate fabric material having first and second opposite facing surfaces 50, 52 (FIG. 7) and first and second terminal ends 46, 48 (FIG. 2). The first terminal end 46 of each tether 44 is fixed to the front wall 28 of the air bag 12 and the second terminal end 48 of each tether 44 is fixed to the back wall 26 of the air bag 12. Alternatively, the second terminal end 48 of each tether 44 can be fixed to a reaction plate (not shown) or other adjacent structure instead of the back wall 26.

Figure 6:
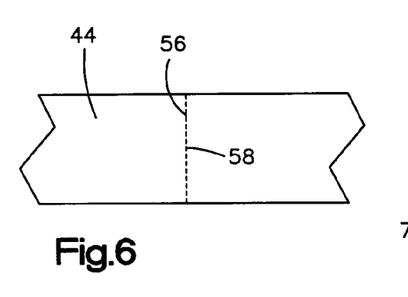
FIG. 6 is a sectional view of a tether in the embodiment of FIG. 1 taken along the line 6—6.
Figure 7:
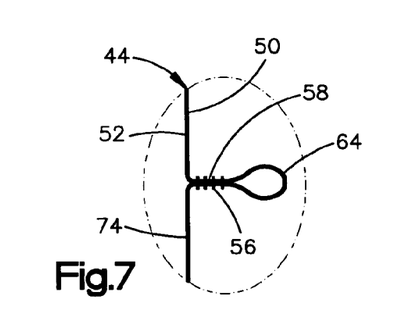
FIG. 7 is an enlarged view of the tether of the embodiment of FIG. 1.

Each tether 44 includes a tear stitch 56 (FIGS. 6, 7). The tear stitch 56 comprises a tear seam 58 which can be constructed of a thread having a specific tear strength that dictates when the tear stitch 56 will tear in response to a specific force applied on the tether. This force is supplied only by the second inflation fluid pressure in the air bag 12.

Thus, the tear stitch 56 is tuned to tear only in response to the force applied on the tether 44 by the second inflation fluid pressure in the air bag 12 in the second mode of operation of the dual stage inflator 14. The tear stitch 56 does not tear in response to the force applied on the tether 44 by the first inflation fluid pressure in the air bag 12 in the first mode of operation of the dual stage inflator 14.

There is enough difference between the first and second inflation fluid pressures in the air bag 12 provided by the dual stage inflator 14 to allow the tear stitch 56 on the tether 44 to differentiate between the specific pressure amounts (FIG. 5) provided by the first and second inflation fluid pressures.

Each tether 44 is secured by the tear stitch 56 at a base portion 74 (FIG. 7) of the tether material, which has been gathered up and overlapped onto itself to form a loop of material indicated schematically at 64 (FIG. 7). The tethers 44 are illustrated in FIG. 1 as having a length shorter than a total length shown in FIG. 2. The tethers are extendible by the amount of material that has been gathered up and overlapped onto itself to form the loop 64 from the shortened state in FIG. 1 to the lengthened state in FIG. 2.

Figure 5:
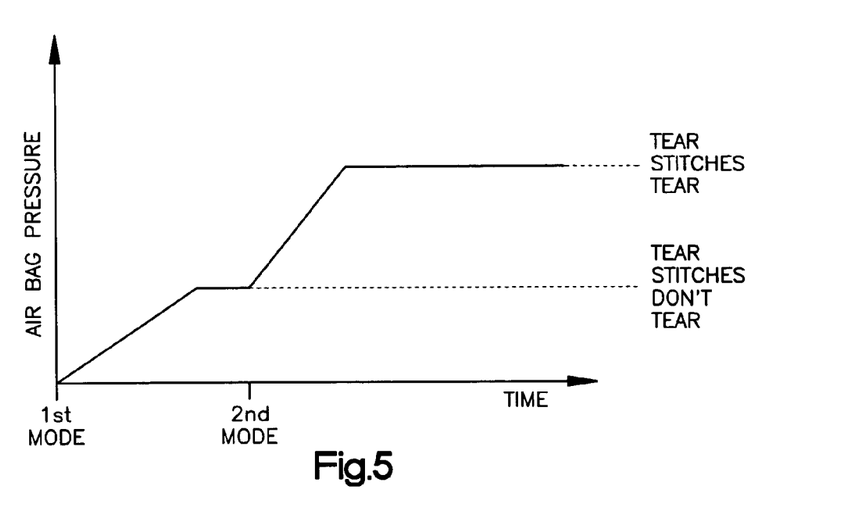
FIG. 5 is a graphical illustration that plots air bag pressure versus time to illustrate the process performed by both the embodiments according to FIGS. 1 and 2 and FIGS. 3 and 4 in accordance with the present invention.

FIG. 5 is a graphical illustration plotting internal air bag pressure versus time. FIG. 5 graphically illustrates the first inflation fluid pressure in the air bag 12 in the first mode of operation of the dual stage inflator 14. In the first mode of operation of the dual stage inflator, after the first igniter 22 has been ignited, the pressure within the air bag increases from initially zero to a first inflation fluid pressure. The pressure values from zero up to and including the first inflation fluid pressure, are not sufficient to tear the tear stitches 56 on the tethers 44. Thus, the tear stitches 56 are still intact in the first mode of operation.

FIG. 5 also graphically illustrates the second inflation fluid pressure in the air bag 12 in the second mode of operation of the dual stage inflator 14. The second igniter 24 is actuated after a predetermined time has passed according to the time delay circuit. The pressure within the air bag increases from the first inflation fluid pressure to a second inflation fluid pressure. The internal air bag pressure values from the first inflation fluid pressure up to the second inflation fluid pressure are not sufficient to tear the tear stitches 56 on the tethers 44. However, once the internal air bag pressure reaches the second inflation fluid pressure, the tear stitches 56 tear. The tear stitches 56 are torn to release the tethers 44 in the second mode of operation.

Figure 3:
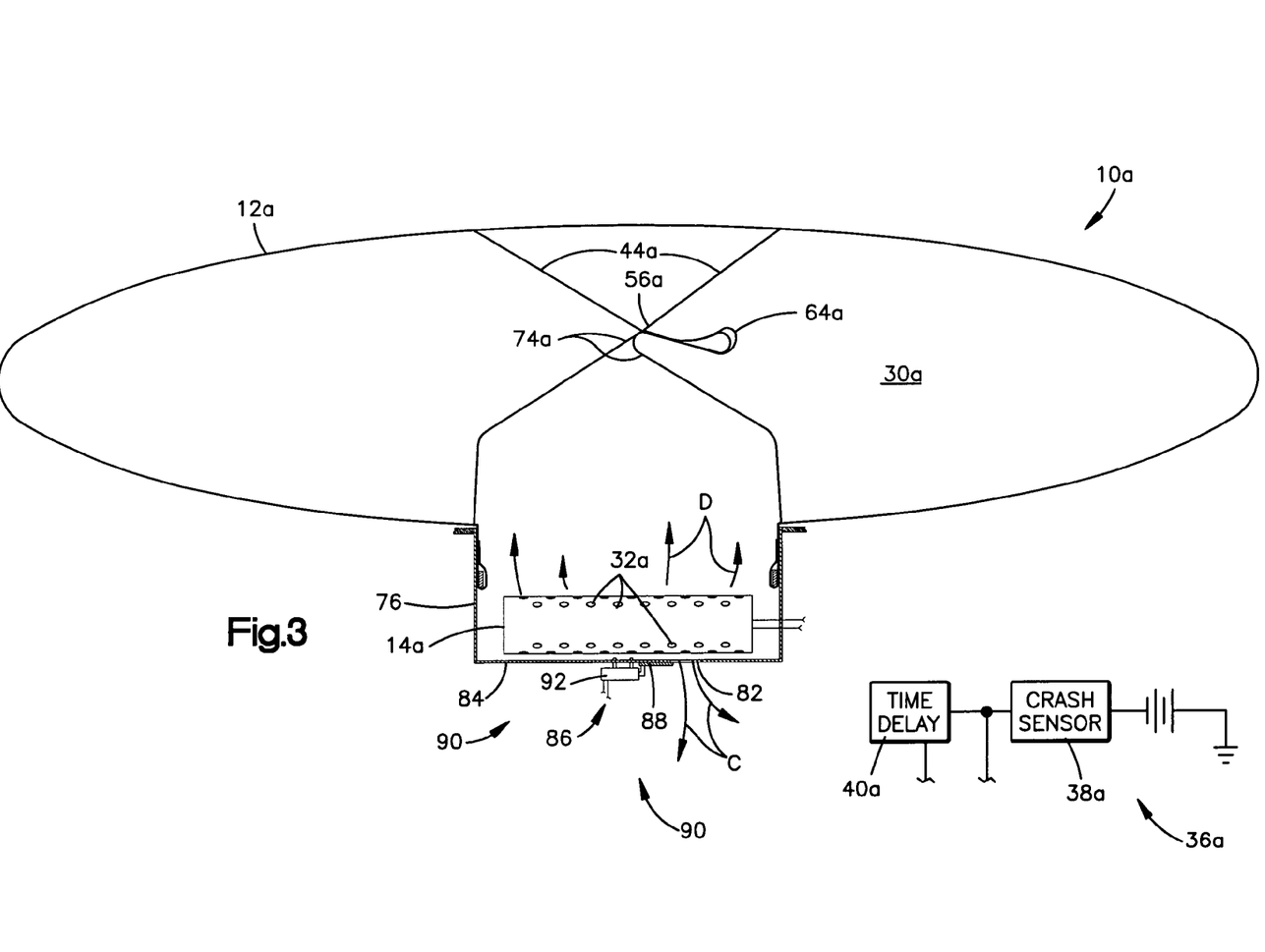
FIG. 3 is a schematic view of a second embodiment of the invention.
Figure 4:
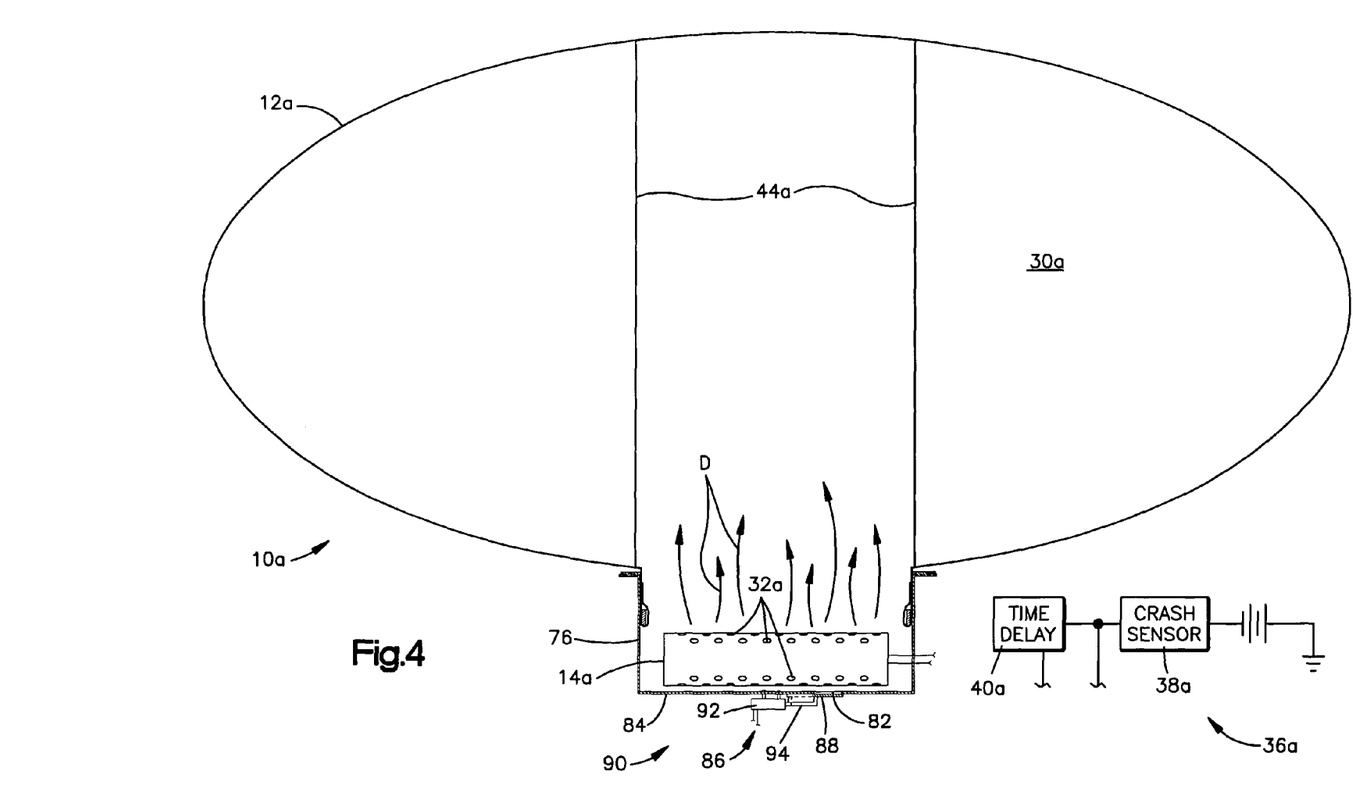
FIG. 4 is a schematic view of the embodiment according to FIG. 3 illustrating some parts in another condition.

FIGS. 3–4 illustrate a vehicle occupant protection apparatus in accordance with a second embodiment of the present invention. The apparatus 10a is similar in many respects to the apparatus 10 (FIGS. 1–2). Parts of the apparatus 10a (FIGS. 3–4) that are the same as or similar to parts of the apparatus 10 are given the same reference numerals with the suffix "a" attached.

In the apparatus 10a, a different type of inflation fluid source is used. In addition, the tethers are constructed differently in the apparatus 10a than in the apparatus 10.

In the apparatus 10a, a single stage inflator 14a is located in a housing 76. The housing 76 is for location in a dashboard on a passenger side of the vehicle (not shown). The single stage inflator 14a includes a single igniter (not shown) and a single combustion chamber (not shown). The combustion chamber contains an amount of material ignitable by the igniter to provide inflation fluid to inflate the air bag 12a in a known manner. The single stage inflator 14a has inflation fluid outlets 32a in fluid communication with the interior chamber 30a of the air bag 12a.

The housing 76 has a vent opening 82 for enabling flow of inflation fluid out of the housing 76 and away from the air bag 12a. The vent opening 82 is illustrated as located in the bottom wall 84 of the housing 76 located opposite the air bag 12a.

A vent assembly 86 is operable to cover and uncover the vent opening 82 to control the flow of inflation fluid through the vent opening 82 and out of the housing 76. The vent assembly 86 includes a movable member in the form of a door 88. The door 88 is supported on the housing 76 for sliding movement between a normally open condition (FIG. 3) enabling flow of a portion of inflation fluid out of the housing 76 away from the air bag 12a through the vent opening 82 and a closed condition (FIG. 4) closing the vent opening 82 enabling flow of all of the inflation fluid into the air bag 12a.

The vent assembly 86 further includes an electrically energizable mechanism 90 for moving the door 88. The electrically energizable mechanism 90 includes a solenoid indicated schematically at 92. An actuator rod 94, or similar structure, is connected between the solenoid 92 and the door 88 for transmitting motive force from the solenoid to the door. The solenoid 92, when electrically energized, is operable to move (push) the door 88 in the direction from the open condition toward the closed condition.

Similar to the apparatus 10, the apparatus 10a includes vehicle electric circuitry indicated schematically at 36a (FIG. 3), which includes a controller (not shown) and a crash sensor 38a. Other sensors (not illustrated) may include an occupant position sensor that generates a control signal indicative of the position of a vehicle occupant in the interior of a vehicle, a buckle switch for generating a control signal indicative of a buckled or unbuckled condition of a seat buckle assembly of the vehicle, or one or more of the following: a sensor that senses the presence of a rearward-facing child seat, a weight sensor, a belt tension sensor, an occupant size sensor, a module temperature sensor, or a crash severity sensor.

The vehicle electric circuitry 36a controls the operation of the single stage inflator 14a and the vent assembly 86. The vehicle electric circuitry 36a also may include a time delay circuit 40a. The time delay circuit 40a delays actuation of the energizable mechanism to move the door to close the vent opening 82 after the single stage inflator 14a has been actuated.

Depending on which of the combination of signals from the sensors is sent to the controller, the controller determines: 1) that no actuation signal is to be sent to the inflator, or 2) that an actuation signal is sent to the inflator to actuate the inflator and simultaneously close the vent opening, or 3) to delay the actuation of the energizable mechanism to move the door to close the vent opening 82 after the single stage inflator 14a has been actuated, or 4) to actuate the single stage inflator without ever closing the vent opening.

In the apparatus 10a, the inflation fluid source is the single stage inflator in combination with the vent assembly 86 of the housing 76. The inflation fluid source has two modes of operation. In the first mode of operation of the inflation fluid source, the igniter of the single stage inflator 14a (FIG. 3) is actuated and the vent opening 82 is normally open to provide a first inflation fluid pressure in the air bag 12a. Specifically, the igniter is actuated to ignite the amount of material in the combustion chamber to provide inflation fluid.

The inflation fluid flows through the inflation fluid outlets 32a into the interior chamber 30a of the air bag 12a. Simultaneously, at least a portion of the inflation fluid escapes through the vent opening 82. Arrows D and C in FIG. 3 schematically illustrate the inflation fluid flowing through the inflation fluid outlets 32a from the single stage inflator 14a into the air bag 12 and out through the vent opening 82, respectively in the first mode of operation of the inflation fluid source.

In the second mode of operation (FIG. 4) of the inflation fluid source, the energizable mechanism 90 is activated to move the door 88 to close the vent opening 82 to block any amount of inflation fluid generated by actuation of the inflator 14a in the first mode of operation of the inflation fluid source from venting through the vent opening 82. The second inflation fluid pressure in the air bag 12a is higher than the first pressure and is achieved when all the inflation fluid is directed to the interior chamber of the air bag 12a in the second mode of operation of the inflation fluid source. Arrows D in FIG. 4 schematically illustrate that all the inflation fluid flowing through the inflation fluid outlets 32a from the single stage inflator 14 flows into the air bag 12a while simultaneously inflation fluid is blocked from escaping through the vent opening 82.

The air bag 12a includes two tethers 44a (FIGS. 3 and 4). The two tethers 44a have been stitched together. A tear stitch 56a holds the two tethers 44a together in FIG. 3. The two tethers 44a are secured together by a single tear stitch 56a at a base portion 74a of the material which has been gathered up and overlapped (schematically represented at 64a) to form loops in the tethers 44a.

The tear stitch 56a is designed to tear only in response to the second inflation fluid pressure in the air bag 12a achieved in the second mode of operation of the inflation fluid source. The tear stitch 56a does not tear in response to the first inflation fluid pressure in the air bag 12a achieved in the first mode of operation of the inflation fluid source.

FIG. 5 graphically illustrates the first inflation fluid pressure in the air bag 12a provided in the first mode of operation of the inflation fluid source. In the first mode of operation of the inflation fluid source, after the inflator 14a has been actuated while the vent opening is uncovered to vent a portion of the inflation fluid away from the air bag 12a, the pressure within the air bag increases from initially zero to a first inflation fluid pressure. The pressure values from zero up to and including the first inflation fluid pressure, are not sufficient to tear the tear stitches 56a on the tethers 44a. The tear stitches 56a are still intact during the first mode of operation of the inflation fluid source.

FIG. 5 also graphically illustrates the second inflation fluid pressure in the air bag 12a in the second mode of operation of the inflation fluid source. The energizable mechanism 90 is activated to move the door 88 to close the vent opening 82 after a predetermined time has passed according to the time delay circuit to block the venting through the vent opening 82 of the inflation fluid generated by actuation of the inflator 14a in the first mode of operation of the inflation fluid source. The pressure within the air bag increases from the first inflation fluid pressure to a second inflation fluid pressure. The internal air bag pressure values from the first inflation fluid pressure up to the second inflation fluid pressure are not sufficient to tear the tear stitches 56a on the tethers 44a. However, once the internal air bag pressure reaches the second inflation fluid pressure, the tear stitches 56a tear. The tear stitches 56a are torn to release the tethers 44a in the second mode of operation of the inflation fluid source.

FIG. 4 illustrates the tethers 44a after the tear stitch 56a has torn. The tethers 44a lengthen in response to the tear stitch 56a tearing because the tear stitch releases the gathered up and overlapped portions of the material 64a of the tethers 44a forming the loops in the tethers. The lengthened tethers 44a allow the air bag 12a to expand its shape shown in FIG. 4. The tethers 44a both lengthen at the same time in response to the single tear stitch 56a tearing.

Figure 8:
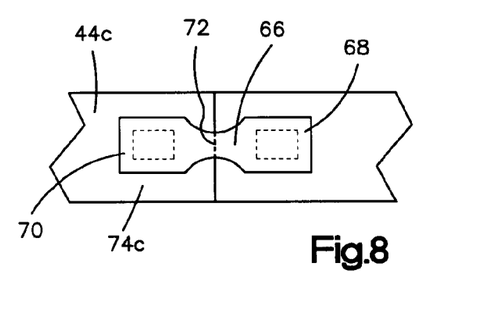
FIG. 8 is a view similar to FIG. 6 of another embodiment of the tether.
Figure 9:
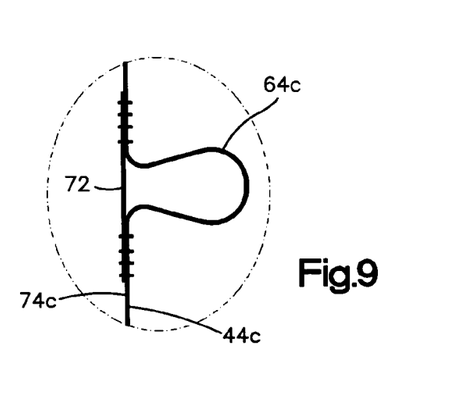
FIG. 9 is a view similar to FIG. 7 illustrating the tether of FIG. 8.

FIGS. 8–9 show an alternative construction of a tether. The tether 44c can have a tear strap 66. The tear strap 66 is an elongate piece of material having two terminal ends 68, 70 and a central portion 72 shown in FIGS. 8–9. The two terminal ends 68, 70 of the tear strap are permanently stitched to the tether 44c on a base portion 74c of the tether material, which has been gathered up and overlapped onto itself 64c (FIG. 9).

The central portion 72 has been intentionally weakened by providing the central portion with a width that is less than the width of the first and second terminal ends 68, 70 of the tear strap 66. In addition or alternatively, the central portion 72 can be intentionally weakened by puncturing the central portion 72 provide a series of small holes across the width of the tear strap 66.

The intentionally weakened central portion 72 has a specific tear strength that dictates when the tear strap 66 will tear in response to a specific inflation fluid pressure applied on the weakened central portion 72. The specific inflation fluid pressure applied on the weakened central portion 72 is the second inflation fluid pressure in the air bag 12, 12a. There is enough difference between the first and second inflation fluid pressures in the air bag 12a provided by the inflation fluid source to allow the central weakened portion 72 of the tether 44a to differentiate between the specific pressure amounts (FIG. 5) provided by the first and second inflation fluid pressures.

Thus, the central portion 72 of the tear strap 66 is designed to tear only in response to the second inflation fluid pressure in the air bag provided in the second mode of operation of the inflation fluid source. The central portion 72 of the tear strap 66 does not tear in response to the first inflation fluid pressure in the air bag provided in the first mode of operation of the inflation fluid source.

From the above description of the invention, those skilled in the art will perceive improvements, changes and modifications. For example, the inflation fluid source instead of being a dual stage inflator can comprise two separate inflators housed in two separate housings. A first inflator housing contains a first igniter and an amount of ignitable material. A second inflator housing contains a second igniter and an amount of ignitable material.

The first and second housings have inflation fluid outlets opening to an air bag. Vehicle electric circuitry determines 1) that no actuation signal is to be sent to either inflator, or 2) that an actuation signal is sent to both inflators to actuate both inflators at the same time, or 3) that the time of activation of the second inflator after the first inflator has been actuated be delayed, or 4) to actuate only the first inflator and not actuate the second inflator ever.

The inflation fluid source has two modes of operation. In the first mode of operation, the first inflator only is actuated to provide a first inflation fluid pressure in the air bag. In the second mode of operation, the first and second inflators are actuated to provide a second inflation fluid pressure in the air bag higher than the first inflation fluid pressure. The second inflation fluid pressure tears stitches on a tether inside the air bag.

Another modification of the above described invention is that the specific tether tear stitch constructions shown in FIGS. 6–9 are interchangeable with each other in the air bags 12, 12a. Also, the number of tethers used in the air bag may be more or less than two.

Such improvements, changes and modifications within the skill of the art are intended to be covered by the appended claims.

The invention claimed is:

1. A vehicle occupant safety apparatus comprising:
   an inflatable vehicle occupant protection device for, when inflated, helping to protect an occupant of a vehicle;
   at least one tether for helping to control the shape of said inflatable vehicle occupant protection device when said inflatable vehicle occupant protection device is inflating;
   an inflation fluid source having two modes of operation,
   in the first mode of operation, said inflation fluid source is activated to provide inflation fluid to increase an inflation fluid pressure in said inflatable vehicle occupant protection device to a first inflation fluid pressure,
   in the second mode of operation, said inflation fluid source is activated to provide inflation fluid to increase said inflation fluid pressure in said inflatable vehicle occupant protection device to a second inflation fluid pressure that is higher than said first inflation fluid pressure,
   said tether remaining intact in response to said first inflation fluid pressure in said inflatable vehicle occupant protection device, said tether also remaining intact as said inflation pressure increases above said first inflation fluid pressure toward said second inflation fluid pressure;
   said tether releasing in response to said inflation fluid pressure in said inflatable vehicle occupant protection device reaching said second inflation fluid pressure.

2. The apparatus according to claim 1 wherein said inflation fluid source is a dual stage inflator having two separately actuatable igniters, and wherein a first one of said two separately actuatable igniters is activated in said first mode of operation and both of said actuatable igniters are activated in said second mode of operation.

3. The apparatus according to claim 2 wherein said inflation fluid source includes vehicle electronic circuitry for delaying activation of said second one of said separately actuatable igniters until after said first one of said separately actuatable igniters is activated.

4. The apparatus according to claim 1 wherein said inflation fluid source includes a single stage inflator and a vent opening for enabling a venting of a portion of said inflation fluid away from said inflatable vehicle occupant protection device.

5. The apparatus according to claim 4 wherein said inflation fluid source includes an actuatable door selectively movable from a first location adjacent said vent opening in which said vent opening is uncovered and a portion of said inflation fluid is vented away from said inflatable vehicle occupant protection device to a second location overlying said vent opening in which said vent opening is covered and said inflation fluid is blocked from venting away from said inflatable vehicle occupant protection device through said vent opening.

6. The apparatus according to claim 5 wherein said single stage inflator is activated and said vent opening is uncovered in said first mode of operation of said inflation fluid source and said single stage inflator is activated and said vent opening is covered in said second mode of operation of said inflation fluid source.

7. The apparatus according to claim 6 wherein said inflation fluid source includes vehicle electronic circuitry for delaying activation of said actuatable door to cover said vent opening until after the single stage inflator is activated.

8. The apparatus according to claim 5 wherein said first inflation pressure is provided by activation of said single stage inflator and simultaneously venting through said vent opening a portion of said inflation fluid away from said inflatable vehicle occupant protection device.

9. The apparatus according to claim 8 wherein said second inflation pressure is provided by blocking said inflation fluid generated by said first mode of operation of said inflation fluid source from venting through said vent opening away from said inflatable vehicle occupant protection device as a result of said actuatable door moving to said second location.

10. The apparatus according to claim 1 wherein said tether has a first length when intact and a second length, longer than said first length, when released.

11. The apparatus according to claim 1 wherein said inflatable occupant protection device is made of fabric material and includes a back wall defining an opening into which said inflation fluid source partially extends and a front wall opposite the back wall, the front and back walls defining an interior chamber into which said inflation fluid flows.

12. The apparatus according to claim 11 wherein said tether comprises a piece of elongate fabric material having first and second opposite facing surfaces and first and second terminal ends.

13. The apparatus according to claim 12 wherein said first terminal end of said tether is fixed to said front wall and said second terminal end of said tether is fixed relative to said back wall.

14. The apparatus according to claim 10 wherein said tether includes at least one tear stitch which tears in response to said second inflation fluid pressure in said inflatable vehicle occupant protection device, said tear stitch extending across a width of said tether, and said tether releasing to lengthen from said first length to said second length in response to said tear stitch tearing.

15. The apparatus according to claim 14, wherein said tether lengthens to enable the shape of the inflated inflatable vehicle occupant protection device to change.

16. The apparatus according to claim 14 wherein said tear stitch is formed by a thread that secures together longitudinally spaced portions of said tether.

17. The apparatus according to claim 14 wherein said tear stitch is located on a separate tear strap that is permanently sewn to said tether, said tear strap having a portion with a narrowed width that is adapted to remain intact when the first inflation fluid pressure is provided to the inflatable vehicle occupant protection device and is adapted to tear when the second inflation fluid pressure is provided to the inflatable vehicle occupant protection device.

18. The apparatus according to claim 14 wherein said tether, when in said first length, includes a portion of said material gathered together and forming a loop and secured by said tear stitch.

19. The apparatus according to claim 14 wherein a plurality of tethers are coupled together with a single tear stitch so that the plurality of tethers lengthen in response to said single tear stitch tearing.

20. A vehicle occupant safety apparatus comprising:
    an inflatable vehicle occupant protection device for, when inflated, helping to protect an occupant of a vehicle;
    at least one tether for helping to control the shape of said inflatable vehicle occupant protection device when said inflatable vehicle occupant protection device is inflating;
    an inflation fluid source including separate first and second combustion chambers, said first and second combustion chambers including material that is ignitable to generate inflation fluid, a first igniter associated with said first combustion chamber and actuatable for igniting said material of said first combustion chamber, a second igniter associated with said second combustion chamber and actuatable for igniting said material of said second combustion chamber, said inflation fluid source having two modes of operation,
    in the first mode of operation, only said first igniter is actuated to ignite the material of said first combustion chamber, inflation fluid generated in the first mode of operation increasing an inflation fluid pressure in said inflatable vehicle occupant protection device to a first inflation fluid pressure,
    in the second mode of operation, both said first and second igniters being actuated to ignite the material of both the first and second combustion chambers, inflation fluid generated in the second mode of operation increasing said inflation fluid pressure in said inflatable vehicle occupant protection device to a second inflation fluid pressure that is higher than said first inflation fluid pressure,
    said tether remaining intact in response to said first inflation fluid pressure in said inflatable vehicle occupant protection device, said tether also remaining intact as said inflation pressure increases above said first inflation fluid pressure toward said second inflation fluid pressure;
    said tether releasing in response to said inflation fluid pressure in said inflatable vehicle occupant protection device reaching said second inflation fluid pressure.

* * * * *